Aug. 13, 1963    V. PRIEDNIEKS ET AL    3,100,351
KEYBOARD TRAINING DEVICE
Filed March 7, 1960    3 Sheets-Sheet 1
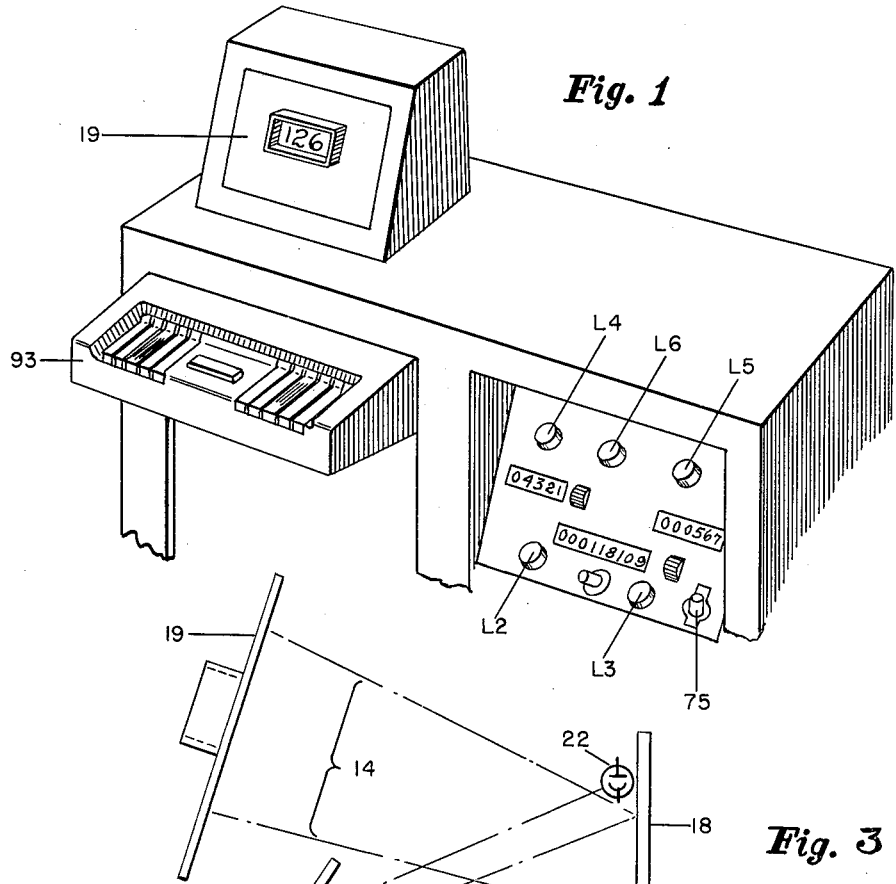
Fig. 1
Fig. 2
Fig. 3
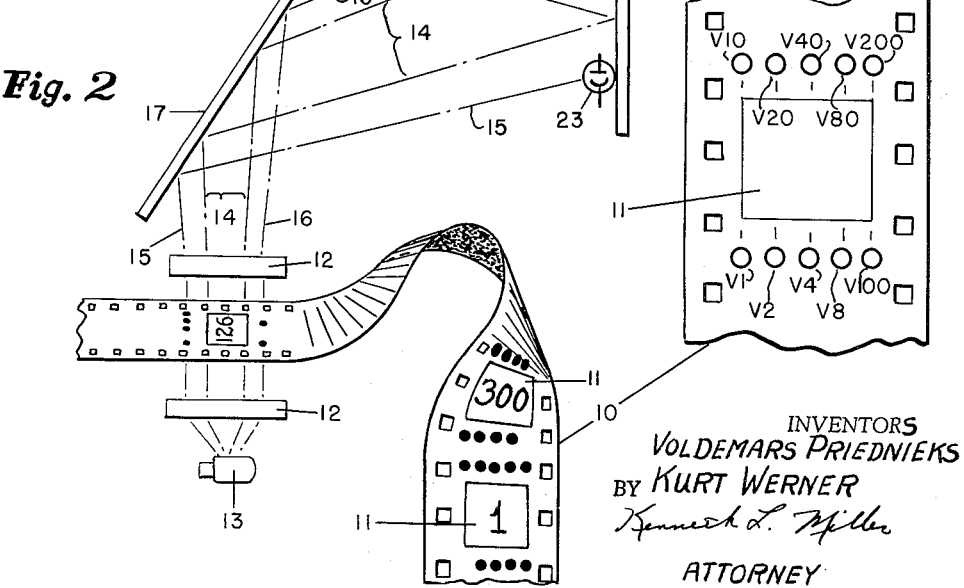
INVENTORS
VOLDEMARS PRIEDNIEKS
BY KURT WERNER
ATTORNEY

INVENTORS
*VOLDEMARS PRIEDNIEKS*
BY *KURT WERNER*

ATTORNEY

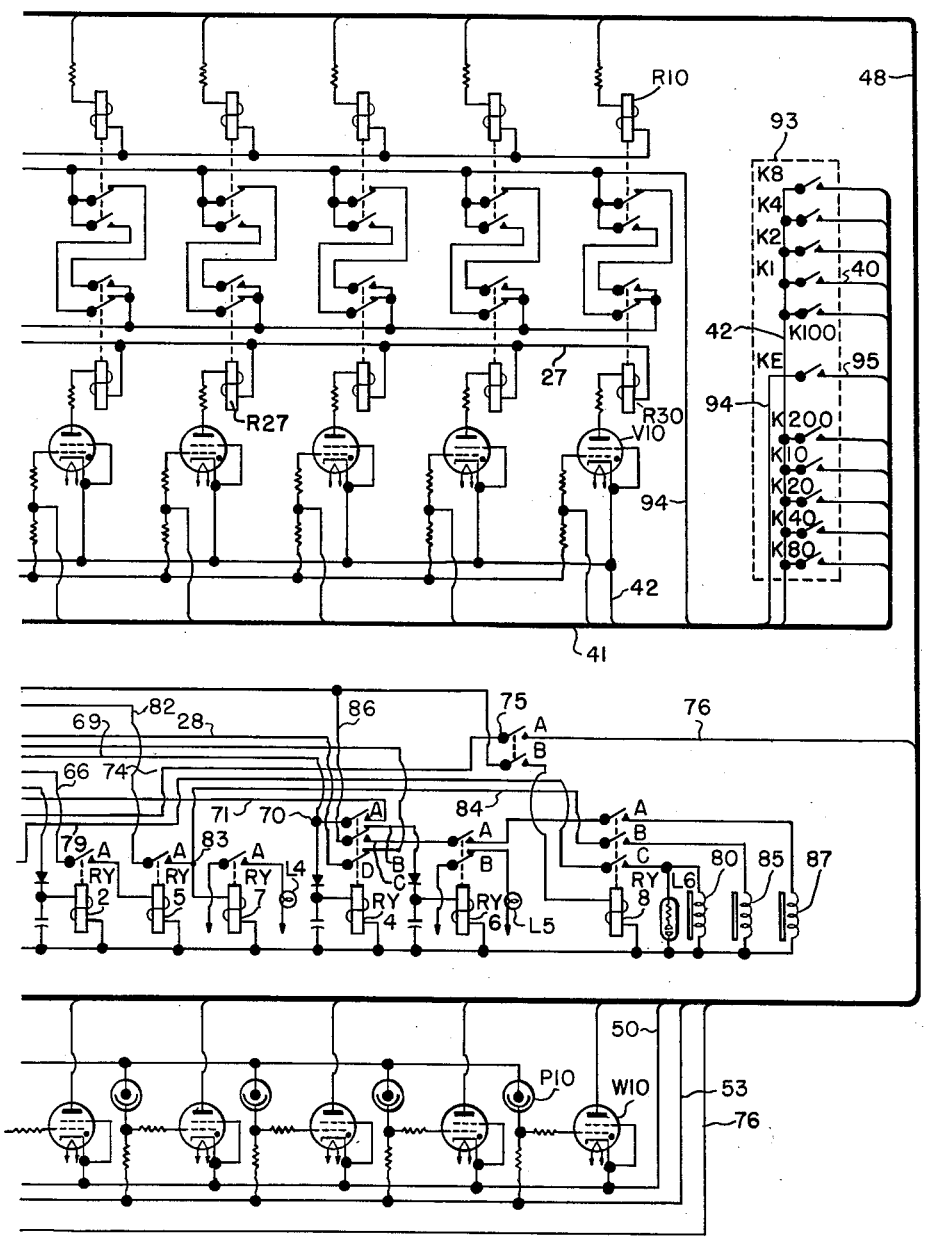

United States Patent Office 3,100,351
Patented Aug. 13, 1963

3,100,351
KEYBOARD TRAINING DEVICE
Voldemars Priednieks and Kurt Werner, Detroit, Mich., assignors to Burroughs Corporation, Detroit, Mich., a corporation of Michigan
Filed Mar. 7, 1960, Ser. No. 13,320
6 Claims. (Cl. 35—6)

This invention relates in general to keyboard training devices and more particularly to such training devices wherein the operator is able to determine his efficiency at a keyboard device by having a visual indication of errors made in the operation of said keyboard.

In the present state of sorting machines and the like, it is desirable that an operator, by receiving a visual image of an object destination, be able to operate a keyboard in accordance with the proper destination in a minimum length of time. Such devices, for example, are finding increasing usage in the field of mail sorting machines wherein the address information is placed upon mail pieces in a coded form and the information is automatically moved into a viewing position of an operator who depresses selected keys in accordance with the code appearing on the individual mail pieces to direct the mail pieces into respective bins for proper routing and delivery. With the post offices receiving an ever increasing volume of mail each year, automatic mail sorting devices have become a necessity in order to properly handle the mail. Accordingly, it is essential that operators become proficient in routing the mail to their proper destinations.

Since mail sorting machines are rather complicated and expensive it is proposed that the on-line machines not be unnecessarily tied up in order to train new operators but that a specific training device be made available for such purposes. Accordingly, one of the objects of this invention is to provide a keyboard training device which may be readily used to prepare operators for advancement to the on-line sorting machines.

Another object of this invention is to provide a keyboard training device which is capable of allowing operation and recordation of the validity of each keyboard entry at a high rate of speed.

Another object of this invention is to provide a training device which is capable of having an adjustable amount of time in which the operator may enter his keyboard manipulation. This operating time may be readily controlled to shorten the time available for entry after the operator becomes more agile in his operation.

Another object of this invention is to provide a training device wherein the keyboard is arranged in coded form and wherein the operator has a visual presentation on a screen which dictates the code to be indexed into the keyboard and a further recorded indication of the validity of his keyboard entry.

In general, the circuits of the present invention function to attain the above enumerated objects in a manner now to be described. It will be assumed that an operator has as his objective the need for glancing at a document which has a destination or image imprinted thereon in decimal form and that he should mentally translate the observed decimal number to a special modified variety of the standard binary code for entry on a keyboard.

In order to provide the operator with simulated working conditions, the training device of the present invention is arranged to periodically present on a screen a visual presentation of a decimal number requiring him to mentally translate the visual presentation or image into a modified binary code which he must enter into a keyboard within a predetermined period of time. If the operator depresses the proper keys, his entry is compared automatically with a value corresponding to the coded equivalent of the visually presented decimal number and a favorable indication is given. On the other hand, should he in error depress the improper keys the internal comparing system will detect the improper entry and a visual indication will be given of the error as well as a permanent tally being kept on a counter or other type of register.

This machine is also provided with an error key to aid in the training of the operator. Should he depress the improper keys, and realize his mistake within the time limit allowed, he may depress the error key which results in a visual indication of his having caught his mistake as well as a permanent tally kept on a further counting device. The machine is also provided with a variable time delay arrangement in order to vary the time available for a keyboard entry subsequent to the first appearance on the screen of the decimal number representative of a document to be sorted. It is anticipated that an operator inexperienced with the modified binary arrangement of the keyboard might take as long as fifteen seconds, for example, for making the mental translation of the decimal screen presentation to the coded keyboard entry. As the operator becomes more proficient, however, the available time before the screen presentation is advanced to the next decimal number representative of the next document to be sorted, should be shortened and could be of the general order of less than one second.

These general objects are accomplished in the present invention by utilizing a projector optical system illustrated diagrammatically in FIG. 2. The film which is advanced stepwise is illustrated in FIG. 3 as being a conventional photographic film driven by means of sprocket holes along the edges thereof and containing a decimal number which is to be projected upon the viewing screen as well as a coded modified binary spot representation adjacent each frame corresponding to the decimal number.

According to the invention, each step is sufficient to advance the film an amount to present the decimal number as well as the coded equivalent for projection along the optical path. As shown, each frame has its code divided into five columns widthwise of the film with five values V1, V2, V4, V8 and V100 beneath the decimal presentation and a further five values V10, V20, V40, V80 and V200 in advance of the decimal presentation. It is of course understood that the selection of the code and the physical location on the film with respect to the decimal presentation is merely for purposes of illustration and should not be considered as a limitation to the invention. Reading across the five columns beneath the decimal presentation, the coded spots may have a value of 1, 2, 4, 8, and 100 respectively, while the five coded spots above the frame might have the values 10, 20, 40, 80 and 200 respectively. Thus in order to have a coded presentation agree with the decimal equivalent, the coded spots should be summed in order to equal the decimal number appearing in the corresponding frame or location.

Having generally described the invention, the foregoing and other objects and advantages of the invention may be understood from the following description when read in connection with the accompanying drawings in which:

FIG. 1 shows a perspective of one form of the invention;

FIG. 2 shows a diagrammatic illustration of the optical path useful in the embodiment of FIG. 1;

FIG. 3 shows a segment of film illustrative of the code pattern; and

Figure 4:
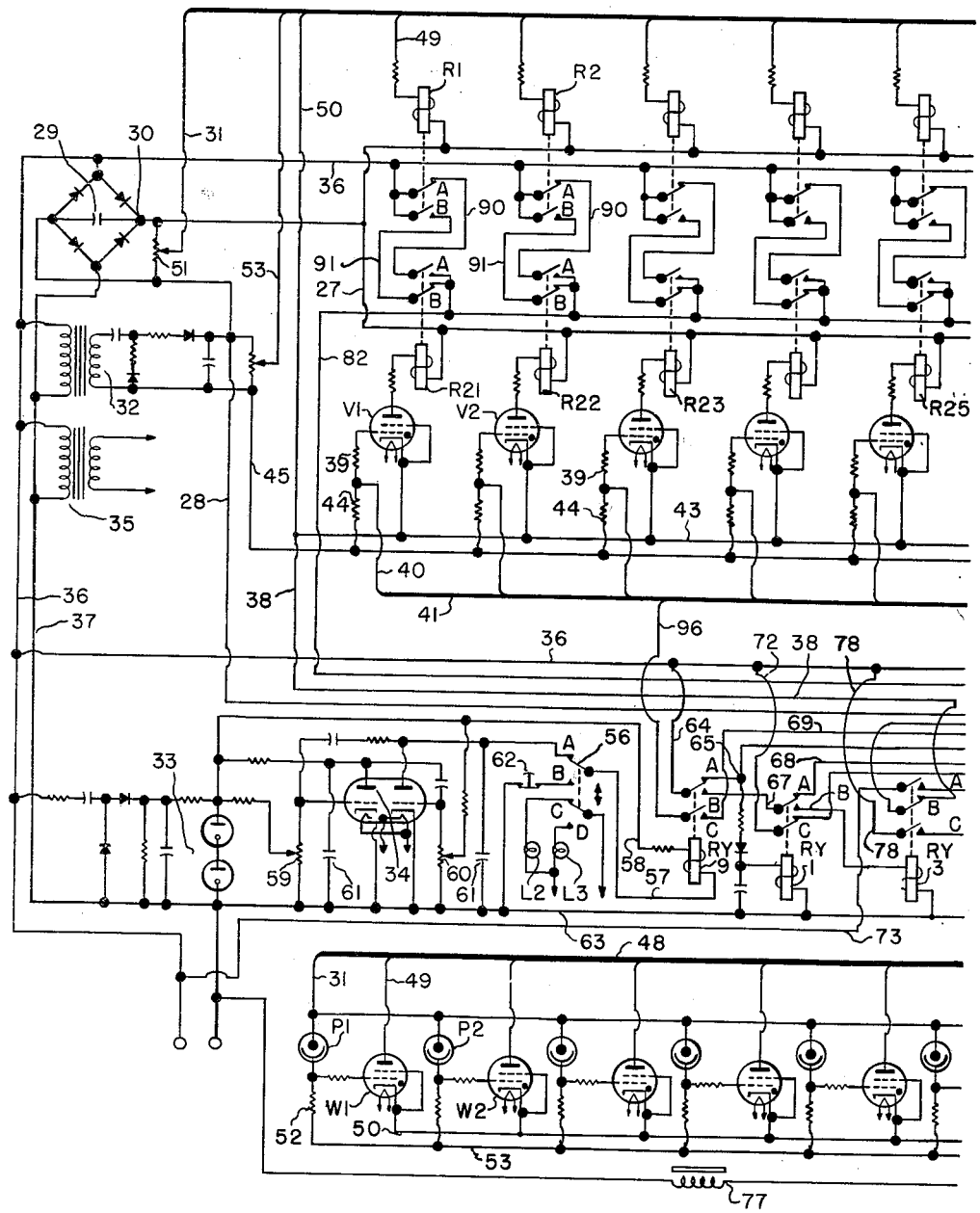

FIGS. 4 and 5 placed side by side illustrate a schematic wiring diagram of one form of the invention.

Reference may now be had more specifically to FIG. 2 in which is illustrated a diagrammatic representation of the photographic film 10 being driven in a conventional manner by means of the film sprocket holes. The film is illustrated as having a plurality of segments 11 with the decimal representations as well as the modified binary coded equivalents recorded thereon. As for example, the decimal number 300 is shown with its equivalent code made up of a plurality of dense spots in the zones V1, V2, V4 and V8 beneath the decimal and zones V10, V20, V40 and V80 above the decimal number. In other words, there is a void, opaque or transparent spot in the position of zone V200 above the decimal number and zone V100 below the decimal number with the resulting sum of 300 corresponding to that number. The film 10 is illustrated as traveling between appropriate lens assemblies 12 for projecting rays of light from light source 13 through the film in the proper optical path. The film between the lens assemblies 12 is tilted forward slightly in FIG. 2 to enable a better understanding of the transmitted information. The light path beyond the lens assemblies 12 is divided into three separate components including a center component 14 which passes through the decimal number area as well as components 15 and 16 which pass through the upper and lower coded zones. Center component 14 is reflected from mirror 17 to mirror 18 and is further reflected in enlarged form to the viewing screen 19. The coded components are reflected by mirror 17 and impinge upon upper and lower photocell banks 22 and 23 respectively. Each of the banks 22 and 23 includes five photocells corresponding to the ten coded modified binary zones. The photocells P1–P10 are in turn connected to circuitry in a manner hereinafter described in connection with FIGS. 4 and 5. Motor drive means for advancing the film to present respective decimal numbers in proper optical alignment are of course provided but are conventional and do not form a specific part of this invention.

An understanding of the specific circuitry involved for accomplishing the foregoing results may now be had by reference to FIGS. 4 and 5. There is illustrated a bank of ten amplifiers which may for example be thyratron gas tubes V1–V10. Tubes V1–V10 are connected to their respective plate voltage supplies through key relays R21–R30 respectively along line 27. The cathodes of tubes V1–V10 are returned through normally closed relay contacts as hereinafter described along line 28 to the opposite side of the power supply 29.

Power supply 29 is of conventional type and provides a positive potential at terminal 30 with a variable potential available at line 31 for photocells P1–P10 in a manner hereinafter described. Power supplies 32 and 33 are also conventional and provide a controlled bias to the thyratrons and positive potential to the multivibrator 34, respectively. Transformer 35 provides a 6 volt alternating current supply for lamps and tube filaments throughout. Lines 36 and 37 are connected to the input sources of alternate current supply.

Each of the tubes V1–V10 is connected in the same manner and only one will be described with it being expressly understood that the remaining tubes have corresponding connections. V1, as has been mentioned, receives its plate supply from line 27 to plus terminal 30 and its cathode is connected to the negative terminal of supply 29 along the path including line 38, contact RY3B, RY4D and conductor 28. The grid of tube V1 connects through resistor 39, line 40, cable 41, key switch K1, line 42 and cathode common return line 43. Connected to resistor 39 is resistor 44 which normally supplies tube V1 with negative grid bias over line 45 completing the path to the negative terminal of bias supply 32. Tubes V1–V10 are associated with keyboard switches K1, K2, K4, K8, K100, K10, K20, K40, K80 and K200 respectively. When the respective key switch is closed it completes a path from the cathode associated with the respective switch to the junction between the resistors 39 and 44 removing the bias from the respective tube V1–V10.

The function of the respective closed keyboard switches is to connect certain cathodes of thyratrons V1–V10 to their respective junctions between resistors 39 and 44. In so doing, the corresponding key relays R21–R30 will be energized through contacts RY3B and RY4D across supply 29. It is within the concept of the invention that tubes V1–V10 may conveniently be eliminated by energizing the key relays directly across supply 29 through series circuits including the respective relays, the respective key switches, and contacts RY3B and RY4D. In this simplified arrangement, the relays will energize the customary holding circuits until opened by RY3 when the film advances. Otherwise, the operation will be the same.

The circuit connections associated with photocells P1–P10 correspond to thyratrons W1–W10 respectively and it will suffice to mention only one of the 10 duplicate circuits. Thyratron W1 of FIG. 4 extends to cable 48 over line 49 over which it receives its plate supply through load relay R1 to terminal 30 of supply 29. The cathode of tube W1 is connected to line 50 through cable 48 to line 50 of FIG. 4 which connects to the common line 43 of the cathodes of tubes V1–V10. Line 43 returns to the minus supply 29 through line 38, RY3B, RY4D and conductor 28 as has been described. Photocell P1 has its positive terminal connected to line 31 and through cable 48 receives an adjustable positive potential from the divider 51 across supply 29. The other terminal of photocell P1 is connected to the grid of thyratron W1 and through resistor 52, line 53, cable 48, line 53 to the adjustable bias supply 32. Thyratron W1 has its bias adjusted so as to be normally nonconducting. However, when photocell P1 is flooded with light, it raises the potential applied to the grid of tube W1 which fires and energizes relay R1. Similarly the photocells associated with tubes W2–W10 control relays R2–R10 over the cable connection 48.

Conventional multivibrator 34 has the plate of its left side connected to the positive terminal of supply 33 and is capacitor coupled to the grid of the right-hand section of tube 34. The plate of the right-hand section of tube 34 is capacitor coupled to the left-hand grid and receives its plate supply through contact A of switch 56, line 57, timing relay RY9 and line 58. Grid resistors 59 and 60 are adjustable to vary the time constants of the multivibrator and to control the relative times of conductions of the respective sides of tube 34. Capacitors 61 are provided for filtering purposes. Switch 56 in its upper position is connected for automatic multivibrator action while in its lower position allows for a manual control of the timing for keyboard entries of the switches K1–K200. Line 57, when switch 56 is in its lower position, extends over contact B, manually controlled switch 62 and common line 63 to the negative side of supply 33. Contacts C and D complete the energization circuit to indicating lamps L2 and L3 respectively.

Tracing now the contact circuits of control relays RY1–RY9, line 36 is connected over line 64 to provide one side of the incoming alternating current supply over contact RY9A, junction 65, and relay RY1 to common return 63 and line 37 to the other side of the alternating current supply. Picking up junction 65, line 66 completes a path over RY2A and error sensing or gating relay RY5 to common return 63. Contact RY9B is established over line 67 to contact RY1A, line 68, and relay RY2 to common return 63. Contact RY9C is connected over line 69 to junction 70 and through relay RY4 to common return 63. Picking up junction 70 there is a connection over RY4A, line 71, contact RY1C, and line 72 to incoming line 36. RY1B is connected to common return 63 through relay RY3.

Line 73, connected to incoming line 36, completes a path through RY3A, line 74, contact A of switch 75 to line 76 which, through cable 48, is completed through the film indexing solenoid 77 back to the other side of the line 37. Line 38, which is connected to the cathodes of thyratrons V1–V10, is connected through RY3B as has been described. Line 36 is further connected over line 78, contact RY3C, line 79, contact RY8C to the frame count relay 80 and indicator lamp L6 to the common return 63. Line 82, which is connected to the fixed contacts of relays R21-R30, is connected to contact RY5A, thence to junction 83, and a path is completed to common return 63 through error relay RY7. A circuit is established over junction 83 to a further path continuing along line 84, contact RY8B to common return 63 through the error count relay 85.

Relay RY7 when energized closes contact A to provide power to error indicating lamp L4. Input line 36 completes an additional path over line 86, contact RY4B, to the common return 63 through relay RY6, and when the movable arm is connected to contact RY4C, a path is completed to contact RY6A and RY8A to common return 63 through the error key count relay 87. Relay RY6 when energized opens contact B to deenergize error key lamp L5. Relay RY8 has its path completed across the line 36 to line 63 and 37 over contact B of switch 75. It is noted that relay RY1, RY2, RY4 and RY6 are provided with capacitors across the windings in order to delay their de-energization once the power is removed from across the winding.

In connection with the circuits of film relays R1-R10 and key relays R21-R30, since the contacts are connected in a duplicated manner it will be sufficient to describe only the R1 and R21 contacts. Incoming line 36 is connected over contact R1A and line 90 to contact R21A and to line 82 as hereinbefore mentioned. Line 82 is also connected over contact R21B and line 91 through contact R1B to line 36.

Returning to the keyboard 93, which contains key switches K1-K200, it will be seen that error correcting key KE has one terminal connected over line 94 to incoming line 36 and the other terminal connected over line 95 and cable 41 to line 96 which connects to contact RY9C.

In operation, it will be assumed that the thyratrons V1-V10 and W1-W10 have been de-energized by having their cathode circuits opened momentarily resulting in the de-energization of film relays R1-R10 associated with the latter thyratrons and key relays R21-R30 associated with the former thyratrons. It will be understood that should switch 56 be in its upper or automatic position the multivibrator 34 will periodically energize and de-energize relay RY9. The counts on the console counters will be manually reset to zero and an operator will be prepared to have his first decimal number brought into view on the viewing screen. In accordance with the time constants determined by resistors 59 and 60 of the multivibrator 34, he will have a predetermined time in which to enter into the keyboard 93 the coded equivalent of the decimal number.

Should he make an error without realizing it, at the end of the predetermined time interval the error light L4 will momentarily flash advising him of his error, the error count relay 85 will advance one unit recording his single error, and the frame count relay 80 will have been advanced one unit indicating the total number of frames presented for viewing. Subsequently the next frame will be moved into view on the viewing screen, advancing the frame count relay 80 one additional unit. In the second presentation of a decimal number, should the operator enter the correct coded equivalent within the time period allotted him by the multivibrator 34, the error lamp L4 will not flash, nor will the error count relay advance a unit, thus allowing the number of correct entries to be determined by subtracting the error counter from the frame counter total. When the next or third frame is moved into view, should the operator enter an improper keyboard amount and discover that he has made the improper entry within the time period allotted him, he may depress the error correcting key KE of keyboard 93 which will cause error key lamp L5 to momentarily flash and cause error key counter relay 87 to energize advancing that counter a single unit. The improper entry will not in this instance be registered on the error counter 85 since the error correcting key KE has been depressed within the multivibrator allotted time period.

Through the use of the three counters 80, 85 and 87 a subsequent record may be kept of the efficiency of each operator and as his speed and accuracy improve, the multivibrator action can be increased within the capacity of the operator.

Assuming that the decimal number 126 is presented for viewing as indicated in FIGS. 1 and 2, the photocells P2, P3, P5 and P7 will have light impinging upon them whereas the remaining photocells will be kept darkened by the spots corresponding to the code for the decimal number 126. This will cause thyratrons W2, W3, W5 and W7 to fire due to the potential applied to their grids over line 31 from supply 29. This will energize relays R2, R3, R5 and R7 causing the A contacts of these relays to open and the B contacts to close. Following a single one of these circuits as when R2 is energized, it will be seen that there is a connection from line 36 over contact R2B, line 91, contact R22B, line 82, to the open contact RY5A. It will be seen that should relay RY5 be energized it will apply this one side of the incoming line 36 across relay RY7 to flash the error lamp L4. It will be seen further that should thyratron V2 fire, it will open contact R22B and will remove the one side of the line 36 from open contact RY5A.

Returning now to the operation of relays RY1-RY9, when the switch 75 is closed, relay RY9 is energized due to current flow through the right-hand side of multivibrator 34. Assuming relay RY1 is maintained energized momentarily due to the capacitor across its winding, contact RY1B thus remains closed and when contact RY9B closes it completes a circuit from line 36 across line 64 through RY9B, line 67, RY1B, line 72, and relay RY3 to the other side of the line. Relay RY3 energizing closes contact A and connects line 73 over line 74, switch contact 75A, line 76, to film indexing solenoid 77 and to the other side of the line 37. Accordingly, when the film indexing solenoid is energized it will, through conventional means, cause the film to be advanced into ready viewing position. It is assumed that this position is the decimal number 126 described above which causes thyratron W2, W3, W5 and W7 to fire energizing relays R2, R3, R5 and R7. Contact RY9C is closed and is reserved for error correcting key KE operation in a manner to be later described. Contact RY3C closing completes a circuit from 36 over line 78, line 79, contact RY8C, now closed, to lamp L6 and relay 80 advancing the frame counter one unit as described. Lamp L6 flashes during each instant that winding 80 is energized to give a visual indication of the frame counts. Relay RY8 has been energized through closed switch contact 75B across the line. Relay RY6 is energized over contact RY4B and line 86 across the power line which turns off error key lamp L5 and prepares a circuit through contact RY6A to the error key counter relay 87.

At this stage, RY1 is still energized due to the energy stored in the capacitor across its winding, RY9 is energized due to a multivibrator 34 current flow, RY3 is energized through the closed B contacts of relays RY9 and RY1, and relay RY8 is energized by the closure of switch 75. Additionally, relay RY6 is energized as described. Relays RY2, RY5, RY7 and RY4 are de-energized.

Then, the energy stored in the capacitor across relay RY1 is dissipated allowing contact RY1B to open. This completes a circuit to energize relay RY2 from line 36 over line 64, contact RY9B, line 67, contact RY1A and line 68. RY1, upon de-energizing, additionally completes a circuit from one side of line 36 over line 72 and contact RY1C to line 71 and to open contact RY4A which acts as a holding circuit for relay RY4 once it becomes energized. When RY1B opens it allows relay RY3 to become de-energized closing contact RY3B. This allows a completed path from line 28 of supply 32 through contacts RY4D and RY3B to line 38 which connects to the cathodes of the thyratrons. Accordingly, when RY3 and RY4 are de-energized, there is a completed path from the thyratron cathodes to the minus terminal of supply 29, but either relay being energized would open the thyratron cathode circuits and allow them to extinguish. RY3C and RY3A on opening release the frame counter 80 and film indexing solenoid 77 as described. RY5 has been prepared for operation over closed contact RY2A, line 66 and junction 65, so that when relay RY9 becomes de-energized, power will be applied to RY5 over contact RY9A.

At this stage of a single cycle, prior to the de-energization of relay RY9, the operator should depress the proper keys in keyboard 93 corresponding to the decimal number appearing on the screen which we have assumed as being the number 126 in this example. He should depress keys K100, K20, K4 and K2 which would connect the cathodes of tubes V2, V3, V5 and V7 to the junctions between resistors 39 and 44, thus allowing the thyratrons associated with these keys to fire and to energize relays R22, R23, R25 and R27. These relays upon energizing cause the contacts B to open and their contacts A to close. If the proper keys have been depresesd, there is no available path completed from line 36 through the open contacts of relays R1–R10 and R21–R30, to line 82, and to contact RY5A. Accordingly, when contact RY5A closes due to the de-energization of RY9, no line potential is applied to junction 83 and the error count relay 85 does not operate.

Should an improper keyboard entry be made, however, and the key K2, for example, fail to be depressed, the thyratron V2 will not fire and relay R22 will remain de-energized which extends a path from one side of the line 36 over closed contact R2B and line 91 to closed contact R22B and line 82, thence to contact RY5A so that when relay RY5 energizes, line potential is applied to junction 83 resulting in the aforementioned error lamp and error count indications.

In the alternative, should the operator depress the incorrect keyboard combinations allowing line potential on open contact RY5A, he may prevent the erroneous indication if he timely depresses error correcting key KE. Depression of key KE applies line 36 potential over line 94 through closed key KE to line 95 through cable 41 and line 96, through closed contact RY9C, and line 69 to energize relay RY4 by completion of a path back to the other side of the line. As described, contact RY4A completes a path to line and acts as a holding circuit for relay RY4. RY4C extends a path from line 36 to line 86, over the contact RY4C to closed contact RY6A, and to closed contact RY8A to energize the error key count relay 87. Thus depression of error correcting key KE allows the relay 87 to increase that count a single unit. Contact RY4B opens but the capacitor across relay RY6 maintains it energized for a short time and the error key lamp L5 will not be lighted unless the energy in the capacitor is dissipated. Contact RY4D opens the cathode circuits to the thyratrons in a manner already explained.

At the end of this operating cycle, multivibrator 34 changes its conduction state to the left-hand side causing relay RY9 to be de-energized which establishes a circuit to relay RY1 over contact RY9A and opens RY9C to the error key. When relay RY1 energizes it prepares the circuit for relay RY3, contact RY1C opens and removes the line potential from conductor 71 and holding contact RY4A, thus causing relay RY4 to be de-energized when its capacitor dissipates the stored energy.

The energy in the capacitor across relay RY2 maintains this relay energized so that there is a completed path over its closed contact A, line 66, junction 65, closed contact RY9A and line 64 to one side of the supply 36, thus causing relay RY5 to become energized. When relay RY5 energizes it closes its contact A and energizes error relay RY7 and error count relay 85. Thus the energization of the error indications depend upon a line potential appearing on line 82 through any of the paths through closed contacts of relays R1–R10 and R21–R30.

Thus in the example described, should the proper keys of keyboard 93 be depressed within the time period available, there would be no potential applied to line 82 and to error relay RY7. However, should the incorrect key be depressed or should no keys be depressed within the time period, line potential is applied over line 82 to error relay RY7. In addition, as has been completely described, an error can be made as long as the error key KE is depressed prior to the cycle change due to multivibrator 34.

If a permanent record of the keys depressed as well as the photocells energized is desired, it is contemplated that the film relays R1–R10 and the key relays R21–R30 may have additional contacts which close energizing solenoid circuits to depress the proper amount keys of two respective printing calculators. In such an arrangement, the error relay RY7 may also have a set of contacts which closes to energize a solenoid circuit to depress an error symbol key on one of the calculator print tapes.

In order to train a number of operators simultaneously, it is within the concept of this invention that the projector may be replaced with a single television camera with a number of monitor viewers at various locations. Each of the operators may be provided with a keyboard but it is anticipated that all but one of the keyboards will be a dummy unit. In this manner, the operators may be rotated, each taking his turn at the "live" keyboard and training may be accomplished with a minimum of equipment.

Thus having described herein preferred embodiments of the invention, it is appreciated that various modifications may be made without departing from the inventive concept disclosed. The scope of the invention should not be confined to the exact mechanism disclosed but rather the inventive aspect comes within the purview of the following claims.

What is claimed is:

1. In a keyboard training device, a training film having a number of frames with each frame having recorded thereon an image and a plural code representation of that image, means for projecting the image so as to be viewable by an operator, means for sequentially and intermittently presenting each frame into viewing position for a predetermined time period, keyboard entry means for entering by an operator a plural coded representation of each said projected image during said predetermined time periods, a comparator including a plurality of gas discharge devices and a like plurality of first relay means, said gas discharge devices controlling the energization of said first relay means, sensing means for detecting each said coded frame portion, first circuit means for controlling the energization of said gas discharge devices to present a first condition to said comparator from said sensing means, second circuit means for directing to said comparator a second condition having the plural coded representation of said keyboard entry means, output circuit means responsive to said energized relay means and to said plural coded keyboard entry means, said output circuit means coupled to said comparator for providing an indication during each said time period of the correspondence between each said first and each said second condition representing said code sensed from said film frame and said keyboard entered code so as to enable the determination from a register of the equivalence of said keyboard entered coded representations.

2. The device as recited in claim 1 wherein said comparator includes a second plurality of keyboard operated relay means individually controlled by said keyboard entry means in accordance with said plural code and wherein a path is completed through closed contacts of said first and second plurality of relay means to energize said output means upon a lack of correspondence between the respective input conditions applied to said comparator and wherein control means are provided permitting a comparison during a terminal portion only of each said predetermined time period.

3. A keyboard training device comprising a frequency adjustable means for conditioning the operation of an error indicating output device at predetermined time intervals, training film means containing a plurality of images and code portions representing said images, means for advancing said film means in steps in synchronism with the time intervals of said frequency adjustable means, sensing means for generating first electrical signals from each said code portion, keyboard entry means for generating second electrical signals during each said step which correspond in each instance to said respective first electrical signals and which are entered by an operator who views each said respective image and translates said image to the same code as contained by said code portions of said film means, comparator means including a first and a second bank of relays operated in accordance with said first and said second electrical signals respectively, said banks of relays having contact means operated in accordance with the equality or inequality of each of said respective first and second signals, circuit control means responsive to said frequency adjustable means for enabling said comparator means during a terminal portion only of said predetermined time intervals, and indicator output means enabled by said circuit control means and coupled to said comparator means to provide an indication enabling a determination to be made as to the validity of each said keyboard entered code.

4. An operator training device comprising a training film with a plurality of frames, each frame including an image and a plural code representation equivalent to said image, means for step-wise moving each frame into a sensing position for a predetermined time period, comparator means for receiving a first and a second signal pattern, said comparator means including a first and a second bank of relay means whose contacts provide a completed electrical path or an open circuited electrical path depending upon the results of such comparison, a timing control circuit having means for initially clearing said comparator means and for sensing during the terminal portion of each said period the equality or inequality of respective signal patterns applied to said comparator means by virtue of said completed or said open circuited electrical path, circuit means responsive to said plural coded values on each said frame to provide a first a signal pattern, keyboard means for providing a second signal pattern, said keyboard entered pattern being provided by an operator who indexes plural keys corresponding to said first signal pattern within each said predetermined time period, both said first and said second signal patterns providing respective energizations to said first and second banks of relay means, and a first indicator means enabled at the terminal portion of each said respective time period to permit a determination to be made regarding the equality or inequality of said keyboard entered pattern.

5. The device as recited in claim 4 having an error correcting key, circuit means responsive to said key and under control of said timing circuit operable within each said predetermined time interval to prevent the indication of said first indicator means, and a further error key operation indicator means for registering the timely operation of said error correcting key.

6. In an operator training device a multivibrator having an adjustable on-off period, a first timing relay having a winding energizable during alternate states of said multivibrator and contacts controllable thereby, an error sensing relay having an energizing winding, contacts of said timing relay in an energizing circuit with said error sensing relay winding, an output circuit connected to contacts of said error sensing relay and to a comparator, first input means providing a first input to said comparator derived from a first plural coded signal, second input means providing a second input to said comparator derived from a keyboard entry means, said second input being provided by an operator in accordance with a plural code to correspond to said first input and entered during the period that said multivibrator is in alternate of its states, said comparator comprising a first and a second bank of relay means whose respective contacts either complete or break an electrical circuit in accordance with the comparison or lack of comparison of said first and said second inputs corresponding to said plural codes, and the operation of said output circuit being responsive to the completed or broken electrical circuit path to provide an indication from which a determination can be made of the correctness of said keyboard entry as detected by said comparator.

References Cited in the file of this patent

UNITED STATES PATENTS

| | | |
|---|---|---|
| Re. 23,030 | Holt | Aug. 24, 1948 |
| 2,266,779 | Loughridge et al. | Dec. 23, 1941 |
| 2,315,741 | Shafer | Apr. 6, 1943 |
| 2,482,242 | Brustman | Sept. 20, 1949 |
| 2,648,829 | Ayres et al. | Aug. 11, 1953 |
| 2,714,201 | Whitehead | July 26, 1955 |
| 2,745,601 | Fowler et al. | May 15, 1956 |
| 2,752,511 | Beaufoy | June 26, 1956 |
| 2,783,454 | North | Feb. 26, 1957 |
| 2,785,388 | McWhirter et al. | Mar. 12, 1957 |
| 2,857,100 | Franck et al. | Oct. 21, 1958 |
| 2,925,586 | Levy | Feb. 16, 1960 |
| 3,052,041 | Luxton et al. | Sept. 4, 1962 |